United States Patent
Yamazaki et al.

(10) Patent No.: US 6,311,504 B1
(45) Date of Patent: Nov. 6, 2001

(54) ABSORPTION HEAT PUMP AND METHOD FOR CONTROLLING THE SAME

(75) Inventors: Shiguma Yamazaki; Masahiro Furukawa; Kazuyasu Iramina, all of Gunma-ken (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/537,544

(22) Filed: Mar. 29, 2000

(30) Foreign Application Priority Data

Mar. 30, 1999 (JP) .................................................. 11-089240

(51) Int. Cl.$^7$ ...................................................... F25B 15/00
(52) U.S. Cl. .................. 62/141; 62/476; 62/497; 62/324.2
(58) Field of Search .............................. 62/476, 478, 483, 62/324.2, 497, 141, 276, 277

(56) References Cited

U.S. PATENT DOCUMENTS

| | | | |
|---|---|---|---|
| 4,505,123 | * | 3/1985 | Kusakabe et al. ...................... 62/148 |
| 4,691,532 | * | 9/1987 | Reid et al. .............................. 62/476 |
| 4,719,767 | * | 1/1988 | Reid, Jr. et al. ........................ 62/476 |
| 5,579,652 | * | 12/1996 | Phillips et al. .......................... 62/476 |
| 5,761,925 | * | 6/1998 | Maeda .................................... 62/476 |

* cited by examiner

Primary Examiner—Henry Bennett
Assistant Examiner—Melvin Jones
(74) Attorney, Agent, or Firm—Weingarten, Schurgin, Gagnebin & Hayes LLP

(57) ABSTRACT

An absorption heat pump and controlling methods thereof for utilizing exhaust heat to obtain high- and low-temperature fluids. The absorption heat pump comprises: a regenerator 1 to which exhaust heat is supplied to evaporate and isolate a refrigerant from a refrigerant liquor; a condenser 2 for condensing refrigerant vapor generated by the regenerator 1; a first evaporator 3 in which refrigerant liquor supplied from the condenser 2 is heated by exhaust heat for evaporation; a first absorber 4 in which the refrigerant vapor evaporated in the first evaporator 3 is absorbed into an absorbent supplied from the regenerator 1; a second evaporator 5 in which refrigerant liquor supplied from the condenser 2 takes heat away from water for evaporation, the water flowing through a heat exchanger pipe 15A; and a second absorber 6 to which part of an absorbent returned from the first absorber 4 to the regenerator 1 is supplied so that the absorbent absorbs the refrigerant vapor evaporated in the second evaporator 5 before being returned to the regenerator 1. The absorption heat pump supplies hot water and chilled water through a hot water pipe 14 and a chilled water pipe 15, respectively. The amount of the cooling water supplied to the second absorber 6, the amount of the refrigerant liquor distributed in the second evaporator 5, and the like are controlled on the basis of the chilled water's temperature detected by a temperature sensor S1.

5 Claims, 3 Drawing Sheets

ABSORPTION HEAT PUMP AND METHOD
FOR CONTROLLING THE SAME

BACKGROUND OF THE INVENTION

1. Field of the Invention

The present invention relates to an absorption heat pump which can utilize exhaust heat from a chemical industrial plant or the like to generate a fluid of higher temperature than the exhaust heat, such as high-temperature steam, as well as provide low-temperature cooling water for a chemical industrial plant or the like in view of the fact that a rise in temperature makes the cooling water unavailable during summer months.

2. Detailed Description of the Prior Art

Conventionally, an absorption heat pumping apparatus and an absorption refrigerator, which utilize exhaust heat from a chemical industrial plant or the like to generate steam of higher temperature than the exhaust heat and generate water of given temperature low enough for cooling water, respectively, have been installed separately from each other.

Such separate installation of an absorption heat pumping apparatus for generating high-temperature steam and an absorption refrigerator for generating given low-temperature water, however, requires a larger installation space for the system. There also is a problem because redundancy among the pipes and components leads to an increase in the cost of the entire system. Accordingly, system miniaturization and cost reduction have been needed.

SUMMARY OF THE INVENTION

The present invention has been achieved to solve the foregoing problems in the conventional art. Specifically, the present invention provides an absorption heat pump comprising: a condenser in which refrigerant vapor supplied from a regenerator is cooled to condense by cooling water, the regenerator being provided in the vicinity of the condenser; a first evaporator in which refrigerant liquor supplied from the condenser is heated by heat held in a heat source fluid, so that a refrigerant evaporates from the refrigerant liquor; a second evaporator in which refrigerant liquor supplied from the condenser takes heat away from a fluid to be chilled, so that a refrigerant evaporates from the refrigerant liquor; a first absorber provided in the proximity of the first evaporator, in which refrigerant vapor supplied from the first evaporator is absorbed into an absorbent and returned to the regenerator, the absorbent being supplied from the regenerator after having its refrigerant evaporated and isolated therefrom, a fluid to be heated being supplied through the first absorber; and a second absorber provided in the proximity of the second evaporator, in which refrigerant vapor supplied from the second evaporator is absorbed into either a part of the absorbent having absorbed the refrigerant and being returned from the first absorber to the regenerator or a part of the absorbent supplied from the regenerator after having its refrigerant evaporated and isolated therefrom, a cooling water being supplied through the second absorber.

The present invention also provides a first controlling method, in which the flow rate of the cooling water supplied to the second absorber in the absorption heat pump having the above-described configuration is controlled in accordance with the temperature of a fluid to be chilled taken out of the second evaporator after chilled by evaporation of the refrigerant.

Besides, the present invention provides a second controlling method, in which the amount of refrigerant liquor distributed in the second evaporator of the absorption heat pump having the above-described configuration is controlled in accordance with the temperature of a fluid to be chilled taken out of the second evaporator after chilled by evaporation of the refrigerant.

In addition, the present invention provides a third controlling method, in which the flow rate of the absorbent supplied to the second absorber in the absorption heat pump having the above-described configuration is controlled in accordance with the temperature of a fluid to be chilled taken out of the second evaporator after chilled by evaporation of the refrigerant.

Moreover, the present invention provides a fourth controlling method, in which the amount of the refrigerant liquor supplied from the condenser to the second evaporator in the absorption heat pump having the above-described configuration is controlled in accordance with the level of the refrigerant liquor in the second evaporator.

The present invention also provides a fifth controlling method, which is the fourth controlling method characterized in that the amount of the refrigerant liquor supplied from the condenser to the second evaporator is controlled through speed controls or start/stop controls to a pump arranged on a refrigerant liquor pipe connecting the condenser to the second evaporator.

According to the absorption heat pump of the present invention, exhaust heat from a chemical industrial plant or the like can be utilized to produce hot water or steam of higher temperature than the exhaust heat. Meanwhile, chilled water as low in temperature as 20° C. can be obtained irrespective of seasons, securing the cooling water for a chemical industrial plant or the like more easily even in summer months.

Furthermore, the single set of regenerator and condenser are combined with the first evaporator and absorber for higher temperatures and the second evaporator and absorber for lower temperatures, eliminating the redundancy among the pipes and components as seen in the conventional art where an absorption heat pumping apparatus for high temperatures and an absorption refrigerator for low temperatures are installed separately from each other. This allows implementation of a compact, inexpensive apparatus that is also capable of reduction in installation space.

Moreover, the first through third controlling methods ensure supply of water or the like that is fully chilled to a given temperature. The fourth and fifth controlling methods preclude shortage of the refrigerant in the second evaporator to allow reliable generation of lower temperatures.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

First Embodiment

Figure 1:
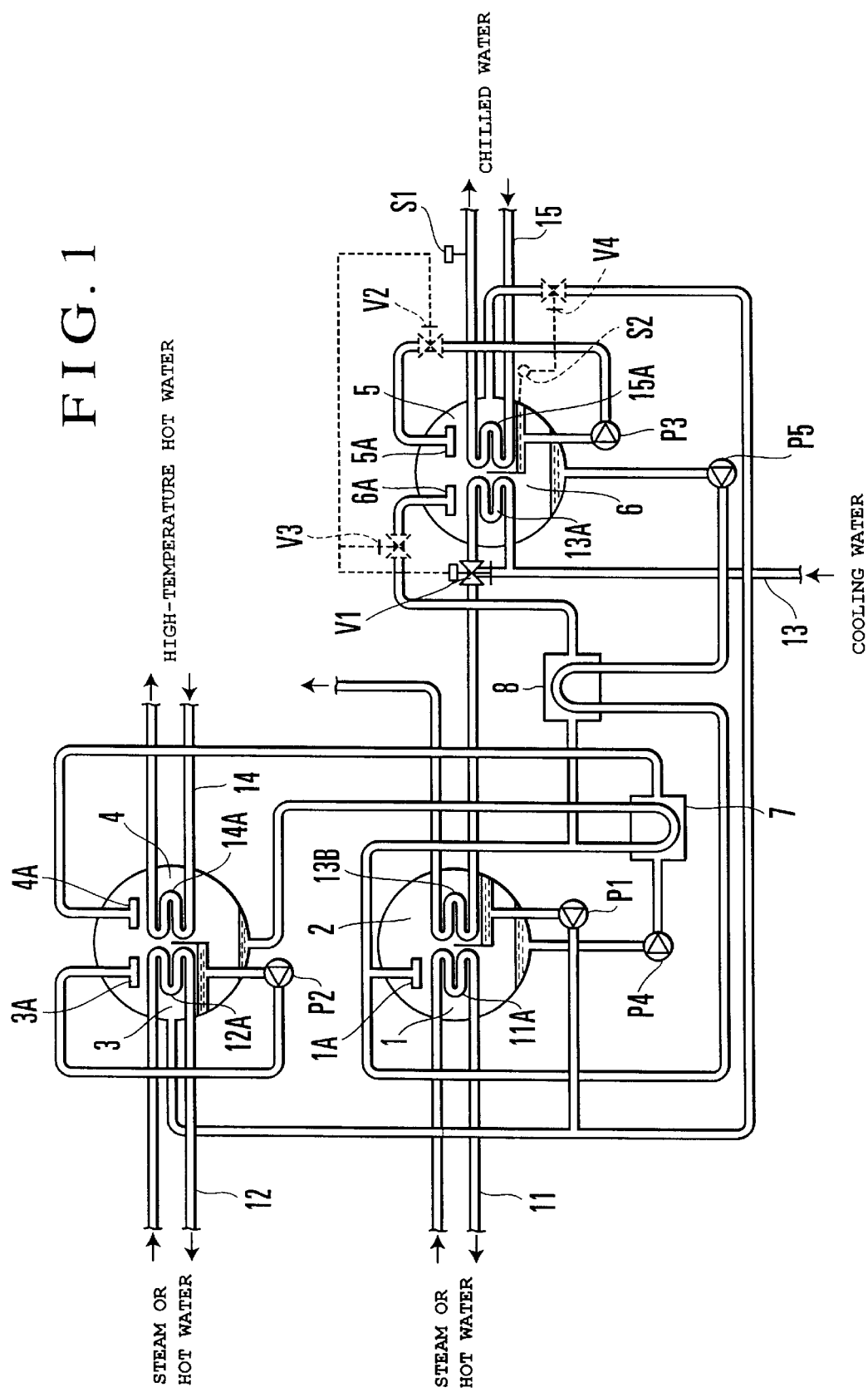
FIG. 1 is an explanatory diagram showing an configuration example of the apparatus.
Figure 2:
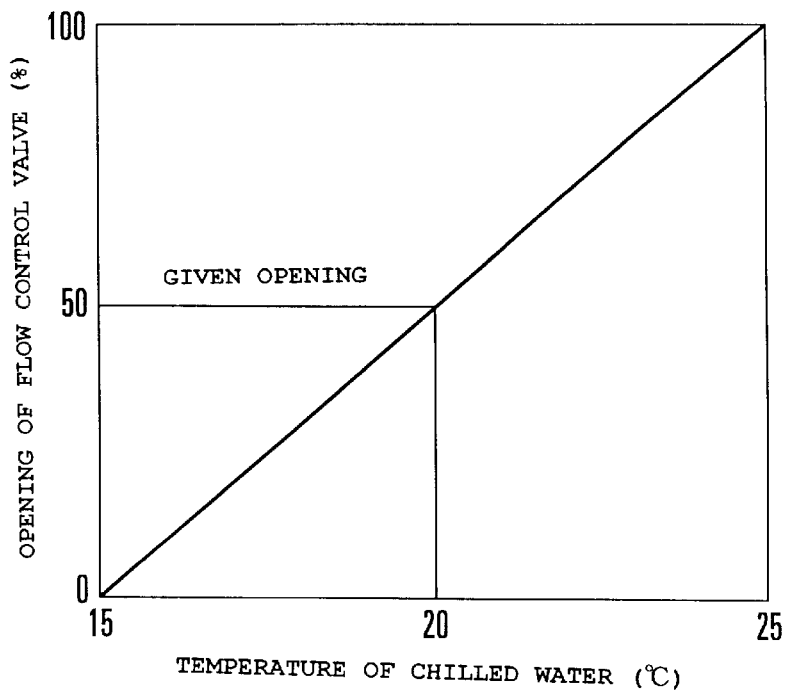
FIG. 2 is an explanatory diagram showing the relationship between the temperature of chilled water and the opening of a flow control valve.

Referring to FIGS. 1 and 2, description will be given of a first embodiment of the present invention. In FIG. 1, the reference numeral 1 designates a regenerator, 2 a condenser, 3 a first evaporator, 4 a first absorber, 5 a second evaporator, 6 a second absorber, 7 a high-temperature heat exchanger, 8 a low-temperature heat exchanger, P1 through P3 a refrigerant pump, P4 and P5 an absorbent pump, V1 a flow control valve, 11 and 12 an exhaust-heat supply pipe, 13 a cooling water pipe, 14 a hot water pipe, 15 a chilled water pipe, 1A, 3A, 4A, 5A, and 6A a distributor, 11A through 15A and 13B a heat exchanger pipe, and S1 a temperature sensor. These components are disposed as shown in the diagram.

More specifically, the regenerator 1 contains the heat exchanger pipe 11A. Absorbent distributed over this heat exchanger pipe 11A from the distributor 1A is heated by, e.g., high-temperature steam or hot water as high in temperature as 80–90° C, which is supplied from a not-shown chemical plant or the like through the exhaust-heat supply pipe 11. This heating evaporates and isolates a refrigerant from the absorbent. The isolated refrigerant vapor is introduced to the condenser 2, where the vapor releases its heat to cooling water, which is supplied to the heat exchanger pipe 13B through the cooling water pipe 13, for condensation.

The refrigerant liquor condensed in the condenser 2 is supplied from the refrigerant pump P1 to both the first and second evaporators 3 and 5. The refrigerant liquor supplied to the first evaporator 3 is distributed over the heat exchanger pipe 12A through the distributor 3A by the refrigerant pump P2. The refrigerant is heated for evaporation by means of high-temperature steam or hot water as high in temperature as 80–90° C, which is supplied to the heat exchanger pipe 12A from a not-shown chemical plant or the like through the exhaust-heat supply pipe 12. The resultant refrigerant vapor is introduced to the first absorber 4, so that the vapor is absorbed into an absorbent and then returned to the regenerator 1. Here, the absorbent is fed by the absorbent pump 4 from the regenerator 1, where the absorbent has had its refrigerant evaporated and isolated therefrom, and is distributed over the heat exchanger pipe 14A through the distributor 4A.

In this connection, the absorbent supplied from the regenerator 1 to the first absorber 4 after having its refrigerant evaporated and isolated therefrom makes a heat exchange, in the high-temperature heat exchanger 7, with the absorbent having absorbed the refrigerant vapor and being returned from the first absorber 4 to the regenerator 1. As a result, the absorbent supplied from the regenerator 1 to the first absorber 4 decreases in temperature while the absorbent returned from the first absorber 4 to the regenerator 1 increases in temperature.

Due to the heat held in the refrigerant vapor generated by the heating in the first evaporator 3 and the heat of reaction evolved upon the absorption of the refrigerant into the absorbent, the water flowing through the heat exchanger pipe 14A is heated up to 120–150° C or so. This water is then supplied to a given heat load through the hot water pipe 14.

Meanwhile, the refrigerant liquor supplied from the condenser 2 to the second evaporator 5 by the refrigerant pump P1 is distributed over the heat exchanger pipe 15A through the distributor 4A by the refrigerant pump P3. The refrigerant liquor takes heat away from the water supplied through the chilled water pipe 15, thereby chilling the water to a temperature low enough for the cooling water in a chemical plant or the like. For example, the water is chilled to a temperature of 20° C.

Taking heat away from the water flowing through the heat exchanger pipe 15A, the refrigerant evaporates in the second evaporator 5. The refrigerant vapor is introduced to the second absorber 6, where the vapor is absorbed into an absorbent that is supplied through the low-temperature heat exchanger 8 and distributed over the heat exchanger pipe 13A through the distributor 6A. In other words, the refrigerant vapor is absorbed into part of the absorbent returned from the first absorber 4 through the high-temperature heat exchanger 7 to the regenerator 1.

The absorbent having absorbed the refrigerant in the second absorber 6 is returned to the regenerator 1 by the absorbent pump P5. Here, a heat exchange is also made between the absorbent supplied from the first absorber 4 to the second absorber 6 after having absorbed some refrigerant vapor and the absorbent returned from the second absorber 6 to the regenerator 1 after having absorbed additional refrigerant vapor. As a result, the absorbent supplied to the second absorber 6 decreases in temperature, and the absorbent returned from the second absorber 6 to the regenerator 1 increases in temperature.

The cooling water to be supplied through the cooling water pipe 13 to the heat exchanger pipe 13A in the second absorber 6 is appropriately controlled in flow rate by the flow control valve V1. That is, the flow rate of the cooling water is controlled so that chilled water flows out of the heat exchanger pipe 15A at a given set temperature, e.g., of 20° C.

Specifically, the greater the flow rate of the cooling water through the heat exchanger pipe 13A is, the better the absorbent distributed over the pipe 13A through the distributor 6A is cooled to intensify the absorption of the refrigerant. The intensified absorption reduces the refrigerant vapor within the second absorber 6 and the second evaporator 5, thereby causing a drop in pressure. This pressure drop encourages the evaporation of the refrigerant in the second evaporator 5, whereby the water flowing through the heat exchanger pipe 15 A is chilled more powerfully.

FIG. 2 shows the control by the flow control valve V1. For example, when the water chilled by the heat exchanger 15A flows out of the chilled water pipe 15 at a given set temperature of 20° C. as shown in FIG. 2, in other words, when the temperature sensor S1 detects the temperature of 20° C., the flow control valve V1 is set at a given opening. If the sensor S1 detects a temperature higher than the given set temperature of 20° C., then the opening of the valve V1 is proportionally made greater to increase the flow rate of the cooling water through the heat exchanger pipe 13A. If the sensor S1 detects a temperature lower than the given set temperature of 20° C., the opening of the valve V1 is proportionally made smaller to limit the flow rate of the cooling water through the heat exchanger pipe 13A. Consequently, the heat exchanger pipe 15A in the second evaporator 5 can provide the chilled water pipe 15 with chilled water as low in temperature as the given temperature of 20° C.

Second Embodiment

Instead of controlling the opening of the flow control valve V1 on the basis of the chilled water's temperature detected by the temperature sensor S1, a flow control valve V2 may be arranged at the position shown by the broken lines in FIG. 1 and the opening thereof be controlled in the same fashion as shown in the fore cited FIG. 2. That is, when the temperature sensor S1 detects the given set temperature of 20° C., the flow control valve V2 is set at a given opening. If the sensor S1 detects a temperature higher than the given set temperature of 20° C., then the opening of the valve V2 is proportionally made greater to increase the amount of the refrigerant liquor to be distributed over the heat exchanger pipe 15A through the distributor 5A. If the sensor S1 detects a temperature lower than the given set temperature of 20° C., the opening of the valve V2 is proportionally made smaller to decrease the amount of the refrigerant liquor to be distributed over the pipe 15A through the distributor 5A. Accordingly, the evaporation of the refrigerant in the second evaporator 2 can be so controlled that the heat exchanger pipe 15A in the second evaporator 5 provides the chilled water pipe 15 with chilled water as low in temperature as the given temperature of 20° C.

Third Embodiment

In the second embodiment described above, the opening of the flow control valve V2 was adjusted on the basis of the chilled water's temperature detected by the temperature sensor S1, so as to control the amount of the refrigerant liquor to be distributed over the heat exchanger pipe 15A through the distributor 5A. This in turn controlled the evaporation of the refrigerant in the second evaporator 5 so that the heat exchanger pipe 15A provided the chilled water pipe 15 with the chilled water as low as the given temperature of 20° C. As an alternative to the opening adjustment, the number of revolutions of the refrigerant pump P3 may be controlled on the basis of the chilled water's temperature detected by the sensor S1, to control the amount of the refrigerant distributed over the pipe 15A through the distributor 5A. This also allows such a control to the evaporation of the refrigerant in the second evaporator 2 that the heat exchanger pipe 15A in the second evaporator 5 supplies the given 20° C. chilled water to the chilled water pipe 15.

Fourth Embodiment

Alternatively, a flow control valve V3 may be arranged at the position shown by the broken lines in FIG. 1, and the opening thereof be controlled in the same fashion as shown in FIG. 2. Specifically, when the temperature sensor S1 detects the given set temperature of 20° C., the flow control valve V3 is set to a given opening. If the sensor S1 detects a temperature higher than the given set temperature of 20° C., the opening of the valve V3 is proportionally made greater to increase the amount of the refrigerant liquor to be distributed over the heat exchanger pipe 13A through the distributor 6A. If the sensor S1 detects a temperature lower than the prescribed set temperature of 20° C., the opening of the valve V3 is proportionally made smaller to reduce the amount of the refrigerant liquor to be distributed over the pipe 13A through the distributor 6A. In this way, the intensity of the refrigerant absorption is adjusted to control the evaporation of refrigerant in the second evaporator 5, so that the heat exchanger pipe 15A in the second evaporator 5 supplies the given 20° C. chilled water to the chilled water pipe 15.

Fifth Embodiment

Figure 3:
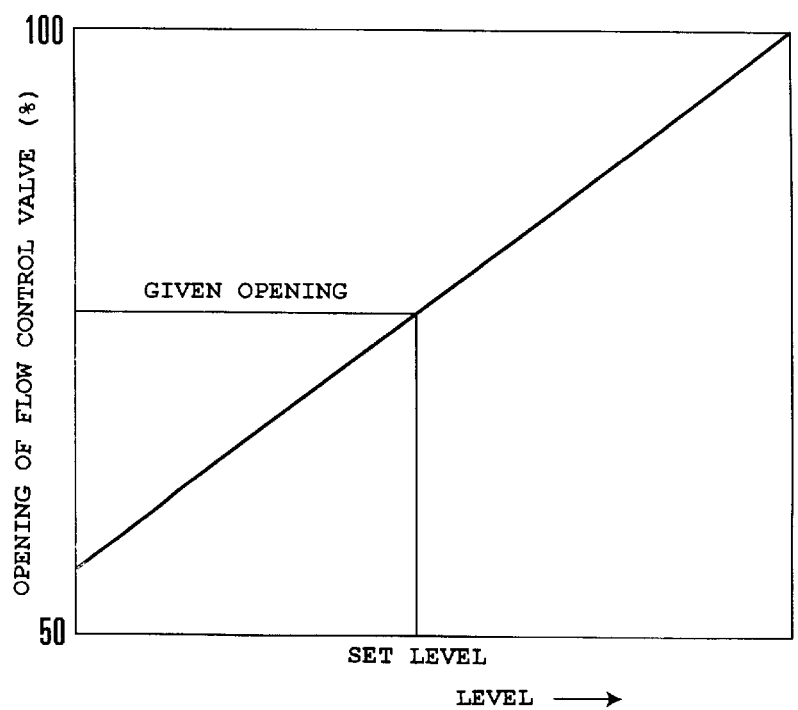
FIG. 3 is an explanatory diagram showing the relationship between the level of a refrigerant and the opening of a flow control valve.

A flow control valve V4, along with a level sensor S2 for detecting the level of the refrigerant liquor held in the refrigerant sump in the second evaporator 5, may be arranged at the position shown by the broken lines in FIG. 1. In this case, the opening of the flow control valve V4 is controlled on the basis of the level detected by the level sensor S2, in a fashion as shown in FIG. 3, for example.

More specifically, when the level sensor S2 detects that the refrigerant liquor is at a given set level, the flow control valve V4 is set to a given opening. If the sensor S2 detects a level higher that the given set level, then the opening of the valve V4 is proportionally made greater to increase the amount of the refrigerant liquor to be supplied from the condenser 2 to the second evaporator 5. If the sensor S2 detects a level lower than the given set level, the opening of the valve V4 is proportionally made smaller to decrease the amount of the refrigerant liquor to be supplied from the condenser 2 to the second evaporator 5. In this way, the refrigerant liquor to be supplied to the second evaporator 5 is controlled in amount to ensure a given amount of refrigerant liquor in the second evaporator 5 all the time. This allows the refrigerant pump P3 to make reliable distribution of refrigerant liquor over the heat exchanger pipe 15A so that the chilled water pipe 15 can be supplied with chilled water as low as the given temperature of 20° C.

Sixth Embodiment

In the fifth embodiment described above, it was the opening of the flow control valve V4 that was adjusted on the basis of the refrigerant level detected by the level sensor S2 to control the amount of the refrigerant liquor to be supplied from the condenser 2 to the second evaporator 5. Alternatively, a refrigerant pump for conveying refrigerant liquor from the condenser 2 to the first evaporator 3 may be provided aside from a refrigerant pump for conveying refrigerant liquor from the condenser 2 to the second evaporator 5. In this case, the number of revolution of the refrigerant pump for conveying refrigerant liquor from the condenser 2 to the second evaporator 5 is controlled on the basis of the refrigerant level detected by the level sensor S2, so as to adjust the level of the refrigerant liquor in the second evaporator 5.

Due to the above-mentioned separate provision of the refrigerant pumps for conveying refrigerant liquor from the condenser 2 to the first and second evaporators 3 and 5, it becomes possible to put higher priority on the feeding of refrigerant liquor to the second evaporator 5 than to the first evaporator 3, thereby giving priority to the supply of chilled water to the chilled water pipe 15. This chilled water can be used as the cooling water for a chemical plant or the like to eliminate the inconvenience of chilled-water shortages in summer months.

The controls in the fifth and sixth embodiments described above for restraining the level of the refrigerant liquor in the second evaporator 5 within a given range may also be achieved through simple open/close operations to the flow control valve V4 or start/stop controls to the additional refrigerant pump in accordance with the level of refrigerant liquor detected by the level sensor S2. These controls in the fifth and sixth embodiments can be appropriately combined with the controls in the preceding first to fourth embodiments.

Figure 4:
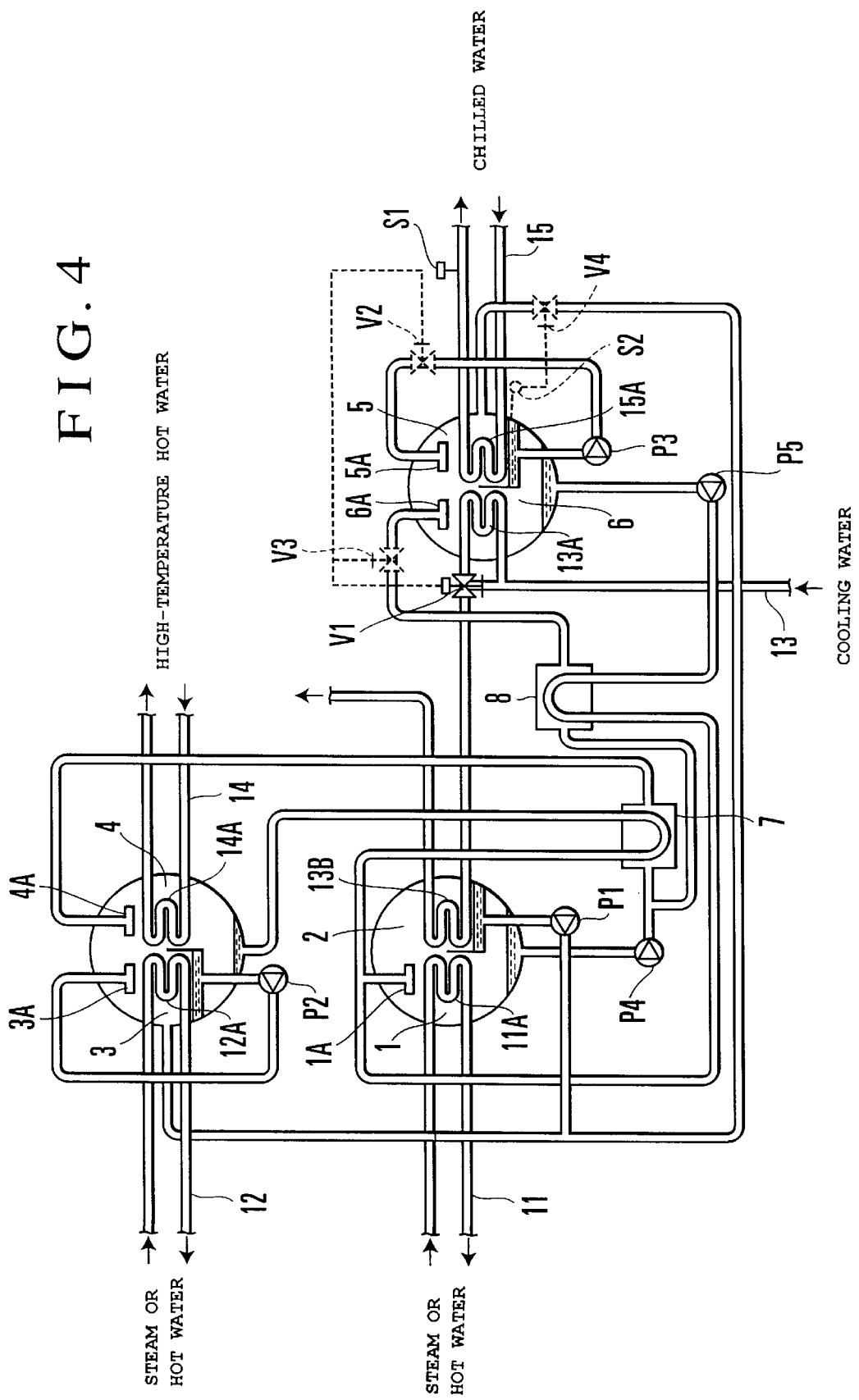
FIG. 4 is an explanatory diagram showing another configuration example of the apparatus.

For an absorption heat pump, the second absorber 5 may be supplied with, e.g., part of the absorbent having its refrigerant evaporated and isolated therefrom in the regenerator 1 as shown in FIG. 4, instead of part of the absorbent having absorbed some refrigerant in the first absorber 4 and being returned to the regenerator 1. Any of the controls mentioned above is similarly applicable to the absorption heat pumping apparatus as shown in FIG. 4.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for controlling an absorption heat pump, comprising the step of:

controlling a flow rate of a second cooling water supplied to a second absorber in an absorption heat pump, said absorption heat pump comprising a condenser in which refrigerant vapor supplied from a regenerator is cooled to condense by a first cooling water, said regenerator being provided in a vicinity of said condenser, a first evaporator in which refrigerant liquor supplied from said condenser is heated by heat held in a heat source fluid, so that a refrigerant evaporates from the refrigerant liquor, a second evaporator in which refrigerant liquor supplied from said condenser takes heat away from a fluid to be chilled, so that a refrigerant evaporates from the refrigerant liquor, a first absorber provided in a proximity of said first evaporator, in which refrigerant vapor supplied from said first evaporator is absorbed into an absorbent and returned to said regenerator, the absorbent being supplied from said regenerator after having its refrigerant evaporated and isolated therefrom, a fluid to be heated being supplied through said first absorber, and said second absorber provided in a proximity of said second evaporator, in which refrigerant vapor supplied from said second evaporator is absorbed into either a part of the absorbent having absorbed the refrigerant and being returned from said first absorber to said regenerator or a part of the absorbent supplied from said regenerator after having its refrigerant evaporated and isolated therefrom, said second cooling water being supplied through said second absorber, wherein the flow rate of said second cooling water is controlled based on a temperature of a fluid to be chilled taken out of said second evaporator after being chilled by evaporation of the refrigerant.

2. A method for controlling an absorption heat pump, comprising the step of:

controlling an amount of refrigerant liquor distributed in a second evaporator in an absorption heat pump, the absorption heat pump comprising a condenser in which refrigerant vapor supplied from a regenerator is cooled to condense by a cooling water, said regenerator being provided in a vicinity of said condenser, a first evaporator in which refrigerant liquor supplied from said condenser is heated by heat held in a heat source fluid, so that a refrigerant evaporates from the refrigerant liquor, said second evaporator in which refrigerant liquor supplied from said condenser takes heat away from a fluid to be chilled, so that a refrigerant evaporates from the refrigerant liquor, a first absorber provided in a proximity of said first evaporator, in which refrigerant vapor supplied from said first evaporator is absorbed into an absorbent and returned to said regenerator, the absorbent being supplied from said regenerator after having its refrigerant evaporated and isolated therefrom, a fluid to be heated being supplied through said first absorber, and a second absorber provided in a proximity of said second evaporator, in which refrigerant vapor supplied from said second evaporator is absorbed into either a part of the absorbent having absorbed the refrigerant and being returned from said first absorber to said regenerator or a part of the absorbent supplied from said regenerator after having its refrigerant evaporated and isolated therefrom, a cooling water being supplied through said second absorber, wherein the amount of refrigerant liquor distributed in said second evaporator is controlled based on a temperature of a fluid to be chilled taken out of said second evaporator after being chilled by evaporation of the refrigerant.

3. A method for controlling an absorption heat pump, comprising the step of:

controlling a flow rate of an absorbent supplied to a second absorber in an absorption heat pump, the absorption heat pump comprising a condenser in which refrigerant vapor supplied from a regenerator is cooled to condense by a cooling water, said regenerator being provided in a vicinity of said condenser, a first evaporator in which refrigerant liquor supplied from said condenser is heated by heat held in a heat source fluid, so that a refrigerant evaporates from the refrigerant liquor, a second evaporator in which refrigerant liquor supplied from said condenser takes heat away from a fluid to be chilled, so that a refrigerant evaporates from the refrigerant liquor, a first absorber provided in a proximity of said first evaporator, in which refrigerant vapor supplied from said first evaporator is absorbed into an absorbent and returned to said regenerator, the absorbent being supplied from said regenerator after having its refrigerant evaporated and isolated therefrom, a fluid to be heated being supplied through said first absorber, and said second absorber provided in a proximity of said second evaporator, in which refrigerant vapor supplied from said second evaporator is absorbed into either a part of the absorbent having absorbed the refrigerant and being returned from said first absorber to said regenerator or a part of the absorbent supplied from said regenerator after having its refrigerant evaporated and isolated therefrom, a cooling water being supplied through said second absorber, wherein the flow rate of the absorbent supplied to said second absorber is controlled based on a temperature of a fluid to be chilled taken out of said second evaporator after being chilled by evaporation of the refrigerant.

4. A method for controlling an absorption heat pump, comprising the step of:

controlling an amount of refrigerant liquor supplied from a condenser to a second evaporator in an absorption heat pump, the absorption heat pump comprising said condenser in which refrigerant vapor supplied from a regenerator is cooled to condense by a cooling water, said regenerator being provided in a vicinity of said condenser, a first evaporator in which refrigerant liquor supplied from said condenser is heated by heat held in a heat source fluid, so that a refrigerant evaporates from the refrigerant liquor, said second evaporator in which said refrigerant liquor supplied from said condenser takes heat away from a fluid to be chilled, so that a refrigerant evaporates from the refrigerant liquor, a first absorber provided in a proximity of said first evaporator, in which refrigerant vapor supplied from said first evaporator is absorbed into an absorbent and returned to said regenerator, the absorbent being supplied from said regenerator after having its refrigerant evaporated and isolated therefrom, a fluid to be heated being supplied through said first absorber, and said second absorber provided in a proximity of said second evaporator, in which refrigerant vapor supplied from said second evaporator is absorbed into either a part of the absorbent having absorbed the refrigerant and being returned from said first absorber to said regenerator or a part of the absorbent supplied from said regenerator after having its refrigerant evaporated and isolated therefrom, a cooling water being supplied through said second absorber, wherein the amount of the refrigerant liquor supplied from said condenser to said second evaporator is controlled based on a level of the refrigerant liquor in said second evaporator.

5. A method for controlling an absorption heat pump according to claim 4, wherein the amount of the refrigerant liquor supplied from said condenser to said second evaporator is controlled through speed controls or start/stop controls to a pump arranged on a refrigerant liquor pipe connecting said condenser to said second evaporator.

* * * * *

UNITED STATES PATENT AND TRADEMARK OFFICE
CERTIFICATE OF CORRECTION

PATENT NO.    : 6,311,504 B1
DATED         : November 6, 2001
INVENTOR(S)   : Shiguma Yamazaki et al.

Page 1 of 1

It is certified that error appears in the above-identified patent and that said Letters Patent is hereby corrected as shown below:

<u>Column 3,</u>
Line 5, "PS" should read -- P5 --; and

<u>Column 4,</u>
Line 63, "fore cited" should read -- forecited --.

Signed and Sealed this

Nineteenth Day of November, 2002

Attest:

Attesting Officer

JAMES E. ROGAN
*Director of the United States Patent and Trademark Office*